United States Patent [19]

Hall et al.

[11] Patent Number: 4,611,605

[45] Date of Patent: Sep. 16, 1986

[54] AXIAL FLOW ROTARY SEPARATOR

[75] Inventors: James W. Hall, Bettendorf, Iowa; Maurice A. Popelier; Daniel L. Leemans, both of Moline, Ill.

[73] Assignee: Deere & Company, Moline, Ill.

[21] Appl. No.: 646,346

[22] Filed: Aug. 29, 1984

[51] Int. Cl.$^4$ .............................................. A01F 7/06
[52] U.S. Cl. ..................................... 130/23; 130/27 T
[58] Field of Search ................... 130/23, 27 T, 27 R; 56/14.6

[56] References Cited

U.S. PATENT DOCUMENTS

| 1,688,662 | 10/1928 | Schlayer | 130/27 T |
| 1,744,334 | 1/1930 | Schlayer | 130/27 T |
| 1,744,336 | 1/1930 | Schlayer | 130/27 T |
| 2,974,668 | 3/1961 | Witzel | 130/27 |
| 4,178,942 | 12/1979 | Nusser | 130/23 |
| 4,398,384 | 8/1983 | Klinner | 170/14.5 |
| 4,408,618 | 11/1983 | Witzel | 130/23 |

Primary Examiner—Jay N. Eskovitz

[57] ABSTRACT

In the axial flow rotary separator of a combine harvester spiral propulsion of the crop material mat is achieved through the cooperation of helical guide vanes in the separator casing and rotor fingers free to swing axially. The rotor is eccentrically mounted so that each finger fully engages the mat for only part of each revolution. While in engagement, the fingers maintain the circumferential propulsion of the mat but each finger is free to be carried downstream by the mat under the influence of the guide vanes, deflected from its normal free fully radially extending position. On disengagement from the mat, centrifugal force restores the finger to its fully extended position ready for reengagement of the mat.

41 Claims, 16 Drawing Figures

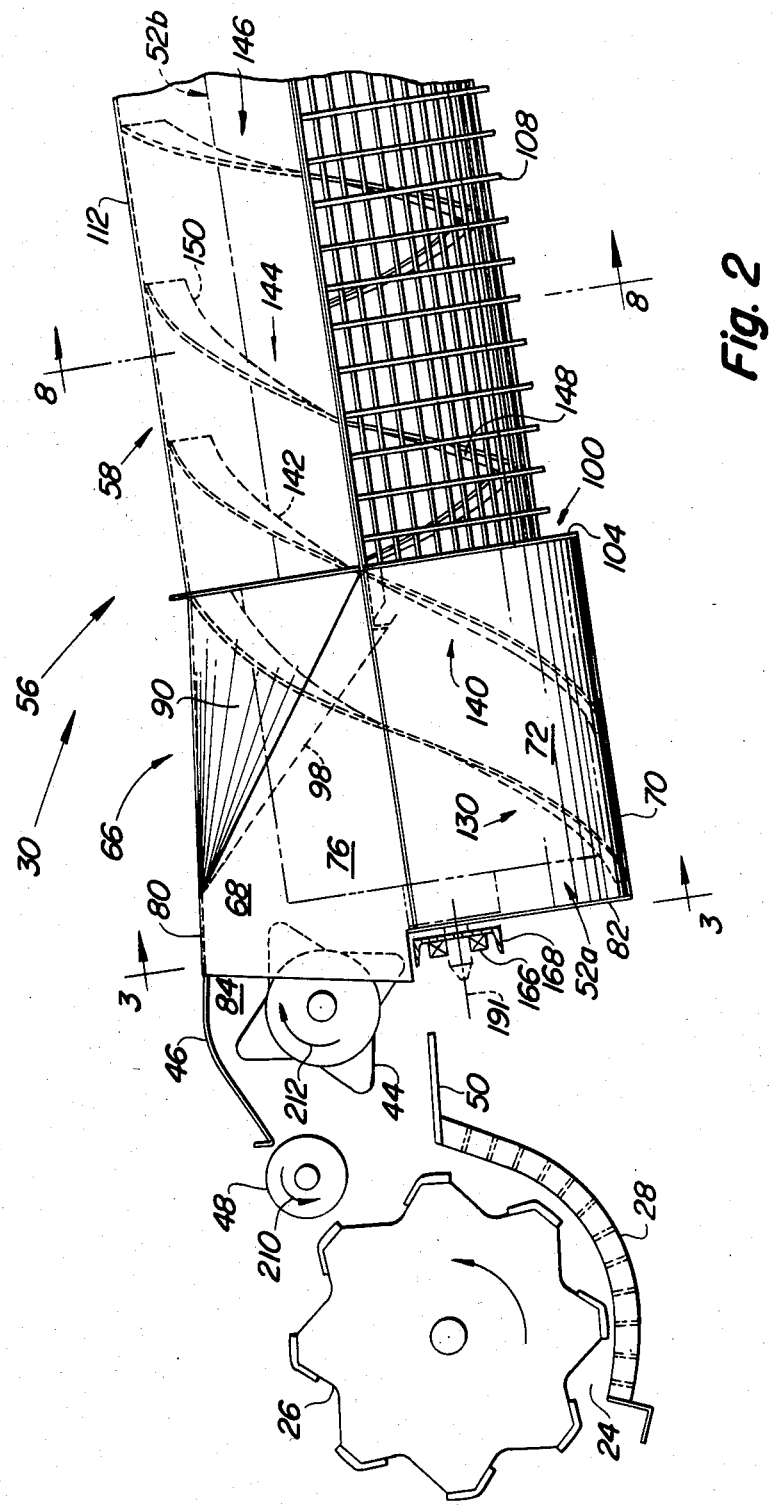

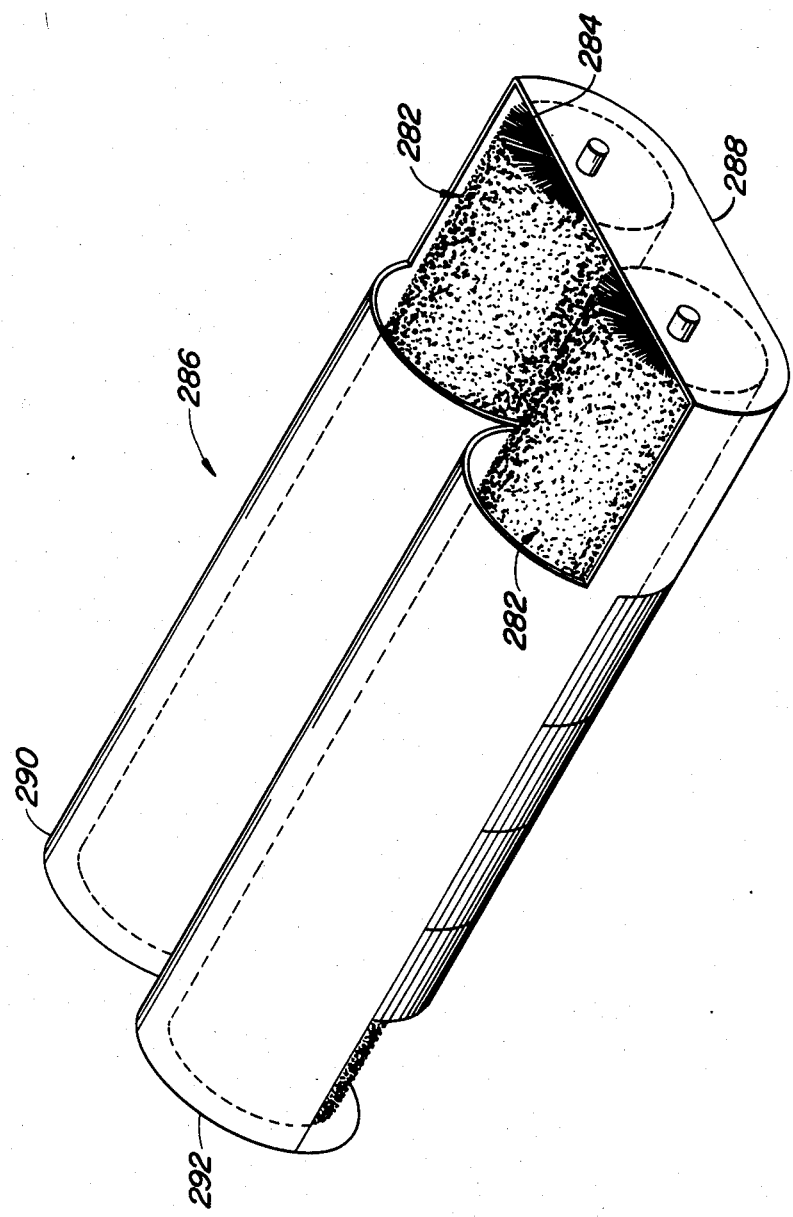

AXIAL FLOW ROTARY SEPARATOR

CROSS REFERENCES TO RELATED APPLICATIONS

U.S. Pat. No. 4,574,815 filed simultaneously herewith in the name of West et al, entitled ROTOR FOR AN AXIAL FLOW ROTARY SEPARATOR and assigned to the assignee of the invention herein, is directed in a preferred embodiment to a tined separator rotor in which the tines are mounted for oblique and eccentric rotation with respect to the separator casing axis and each tine or finger is individually journalled. To the extent that the invention disclosed and claimed in U.S. Pat. No. 4,574,815 is disclosed herein, it is done so only for completeness of description of the operative environment of the invention claimed herein and thus forms no part of the invention claimed herein.

U.S. Pat. No. 4,611,606 filed simultaneously herewith in the names of Hall et al, entitled FEEDING ARRANGEMENT FOR AN AXIAL FLOW ROTARY SEPARATOR and assigned to the assignee of the invention herein, is directed in a preferred embodiment to a twin rotor axial flow separator for a combine in which threshed material is delivered overshot fashion downwardly towards the bite between contra-rotating rotors sharing a common feed casing. To the extent that the invention disclosed and claimed in U.S. Pat. No. 4,611,606 is disclosed herein, it is done so only for completeness of description of the operative environment of the invention claimed herein and thus forms no part of the invention claimed herein.

BACKGROUND OF THE INVENTION

The invention concerns an axial flow rotary separator for a crop harvester in which a rotor rotates within an elongated, surrounding casing and more particularly, one in which finger-like elements of the rotor intermittently engage a mat of crop material while propelling it in a generally spiral path within the casing.

For convenience, crop material engaging elements arranged to penetrate and engage a crop material flow only intermittently will often be referred to below as "fingers" or "finger-like elements" although, of course, the elements may take many forms while still functioning in essentially the same way.

In the discussion which follows, the vehicle for the axial flow rotary separator is assumed to be a self-propelled combine harvester as used for harvesting a variety of grain and other crops. However, separators of this type may of course be used in pull-type combine harvesters as well as in stationary threshing and separating operations.

Although the long history of mechanical threshing and separating of agricultural grain crops has been dominated by the conventional arrangement of transverse threshing cylinder upstream of a rack or straw walkers, there have also been attempts spanning many years to develop axial flow rotary separation. In recent years, combine harvesters embodying this principal have captured a significant portion of the market. Typically their rotors include an upstream threshing portion coaxial with a downstream separator portion. The separating operation per se is carried out on threshed crop material to separate the remaining grain from straw and leaves etc. However, in keeping with common usage, the term separator will sometimes be used in this application to describe a combination of components including infeed arrangements for a rotor or rotors, and discharge provisions in combination with an actual separator portion (and an upstream threshing portion if it forms part of the axial flow unit).

Conventional axial flow rotary separators with driven rotors depend for axial indexing on sliding motion between crop material and angled surfaces within the separator, such as angled blades on the rotor or helical guide vanes on the casing or a combination of the two. Crop engaging elements of the rotor are carried in fixed relation to the rotor frame and propulsion of crop material is not positive. Crop material is deflected axially by angled blades or guide vanes but, typically, there is a strong tendency for material to ride over the rotor elements and hence, power consuming circumferential slippage between rotor and crop material. Overall, there are very high friction losses, specific power consumption is high and handling of some types of material is unreliable. For example, in damp conditions, there may be a tendency to "roping" of the material leading to plugging of the separator.

Nusser (U.S. Pat. No. 4,178,942) has suggested an axial flow rotary separator which substitutes more or less randomly oscillating tines for the fixed crop engaging elements of conventional rotors and relies entirely on helical guide vanes for axial propulsion. However, the operating characteristics of Nusser's device are not clear from his disclosure.

The intermittently engaging, positively propelling and obliquely moving finger-like crop engaging elements of Witzel's rotor (U.S. Pat. No. 4,408,618) make guide vanes unnecessary and dramatically cut specific power requirement while improving material-handling characteristics and maintaining an acceptable level of separating efficiency. There is no doubt that Witzel's separator represents an important advance over known axial flow rotary separators. However, the embodiments disclosed by Witzel are all relatively complex and the potential total cost of using them, resulting from the related costs of manufacturing and reliability, may make them unattractive.

SUMMARY OF THE INVENTION

Accordingly it is an object of the invention to retain, in an axial flow rotary separator, material handling and mechanical efficiency advantages provided by a rotor whose finger-like elements engage the crop material mat only intermittently but which, while in engagement, propel it positively (at least circumferentially) while at the same time contributing to its axial displacement, but to use a rotor and separator casing combination which is inherently lower in cost and more reliable than known separators of this type.

This object may be realized in a separator arrangement in which the separator casing has fixed internal helically disposed guide surfaces and surrounds a rotor characterized in that at least the radially outward portions of its finger-like crop engaging elements are displaceable or resiliently yieldable, at least axially, relative to the rotor frame or body. The casing shape and the rotor disposition within it are such that, as the rotor rotates, each finger approaches and recedes from the casing wall. In operation, rotor speeds and material flow rates are normally such that, essentially, crop material is maintained, in an annular mat of predetermined maximum thickness in contact with the casing wall, so that each finger penetrates and propels a mat portion only periodically, defining a zone or arc of engagement. Casing helical guide surfaces are disposed so that preferably, but not essentially in some portion of the zone of engagement, each mat portion is deflected axially downstream, if necessary carrying the displaceable finger outward portion downstream with it so that it is displaced relative to the rotor frame. Preferably the fingers are designed to be easily displaceable, at least axially, offering negligible resistance to axial movement of the crop material mat portion. The aggregate effect of a plurality of fingers on the rotor cooperating with suitably disposed guide surfaces is of course to propel a received body of crop material in an annular mat generally in contact with the casing spirally downstream. Thus spiral propulsion is achieved essentially without two of the power consuming friction components associated with the rotors of conventional axial separators. Positive circumferential propulsion (and periodic disengagement) eliminates the circumferential slippage friction factor. And the axial freedom of the finger tips allows the casing guide surfaces to direct crop material downstream without generating a related friction component on fixed rotor surfaces. As a result, specific power consumption of separators according to the invention is much less than that of conventional axial flow separators and their mechanical efficiency is comparable to that of separators disclosed by Witzel (U.S. Pat. No. 4,408,618) where the intermittently engaging fingers are directly driven in oblique orbit and casing guide surfaces may be dispensed with.

A feature of rotors according to the present invention is the "righting" of each finger which occurs after disengagement from the crop material mat so that it is prepared for reengagement with the mat on the next rotor revolution. Compared with '618 Witzel, there is an advantage here, especially in operating conditions where, because of overfeeding or insufficient mat rotational speed, effective mat depth increases sufficiently to increase finger arc of engagement beyond about 180 degrees. In such conditions, the (passive) rotor of the present invention behaves benignly, continuing to propel material at least purely circumferentially but also permitting downstream movement if called upon (by, say, a guide surface effect). On the other hand, in the same conditions, a potentially plugging, or at least efficiency reducing, reverse indexing segment is introduced into the arc of engagement of the finger driven in fixed oblique orbit as in '618 Witzel. In his principal embodiments, (Witzel's net overall indexing effect would of course be zero for a 360 degree arc of engagement. But in the embodiment of his FIGS. 22 and 23, in an overfeeding or underspeed condition, performance would be adversely affected by the inability of the folding finger 578 to retract sufficiently to clear the crop material mat on the "return stroke.")

The displaceability of the radially outward portion of each finger relative to the rotor frame may also be achieved, for example, by using flexible resilient elements fixed to the rotor frame (as in a cylindrical brush) or by elements, resilient or stiff, which are pivotably carried by the rotor frame. It is essential to the invention that the displaceability of the rotor element outer portion include a substantial axial component of freedom. This will of course be true of a simple flexible tine of uniform cross section. However, in order to retain more positive control of material, it is preferable that circumferential yielding be limited. This may be achieved by using fixed resilient elements of non-uniform cross section which are more flexible in the rotors axial direction than circumferentially or, of course, by using elements which are pivoted relative to the rotor frame. Preferably the pivot axis of any simply mounted pivoting finger is approximately perpendicular to the axis of rotation of the rotor and extends approximately circumferentially with regard to the rotation of the rotor. Thus the freedom of movement of the outer portion of such a finger would be essentially axial or at least an arc in a plane parallel to and including the axis of rotation of the rotor.

In a particular embodiment of the invention, rotor elements may be mounted in approximately diametrically opposed pairs, rigidly connected and sharing a common pivot axis intersecting the rotor axis. With an eccentrically mounted rotor, only one end of this double-ended element will be active at one time. The downstream axial displacement of the one engaged end is accompanied by a corresponding upstream axial displacement of the disengaged end preparing it or positioning it for its own engagement during the next half revolution of rotation of the rotor.

It is a feature of the invention that the crop engaging elements, following their axially downstream displacement while in engagement with the crop material mat, are automatically restored to a fully extended or ready position for reengagement. This was referred to above as "righting". The restoring or righting means may be simply the resilience of a resilient element, centrifugal action in the case of pivoted elements or, in the case of the double-ended centrally pivoted element, the restoration is a form of automatic indexing derived from the primary function of the element. And, of course, the righting of pivoted elements could be assisted by a spring.

Rotor and casing combinations according to the invention may be characterized as crop material conveyors with particular material handling characteristics deriving from the intermittent engagement of finger-like elements with the crop material. These material handling characteristics are particularly valuable in the separating portion of a combine harvester where separation per se is carried out—the separator casing includes grates allowing separated grain to pass outwards through the casing walls for collection. However, rotors according to the invention may also be used effectively singly or in combination with other similar rotors in the feeding, transition and discharge portions of separators or in combination with the threshing elements in an axial flow rotor threshing portion of a separator.

BRIEF DESCRIPTION OF THE DRAWINGS

FIG. 2 is an enlarged partial left-hand side view of a portion of the crop processing means of the harvester including threshing, transfer from threshing to separating, and a forward portion of the separating section. Rotors are shown in phantom outline only.

FIG. 16, in a left-hand front view of a twin rotor separator with part of the feed casing removed, illustrates a fifth rotor embodiment.

DESCRIPTION OF THE PREFERRED EMBODIMENT

Figure 1:
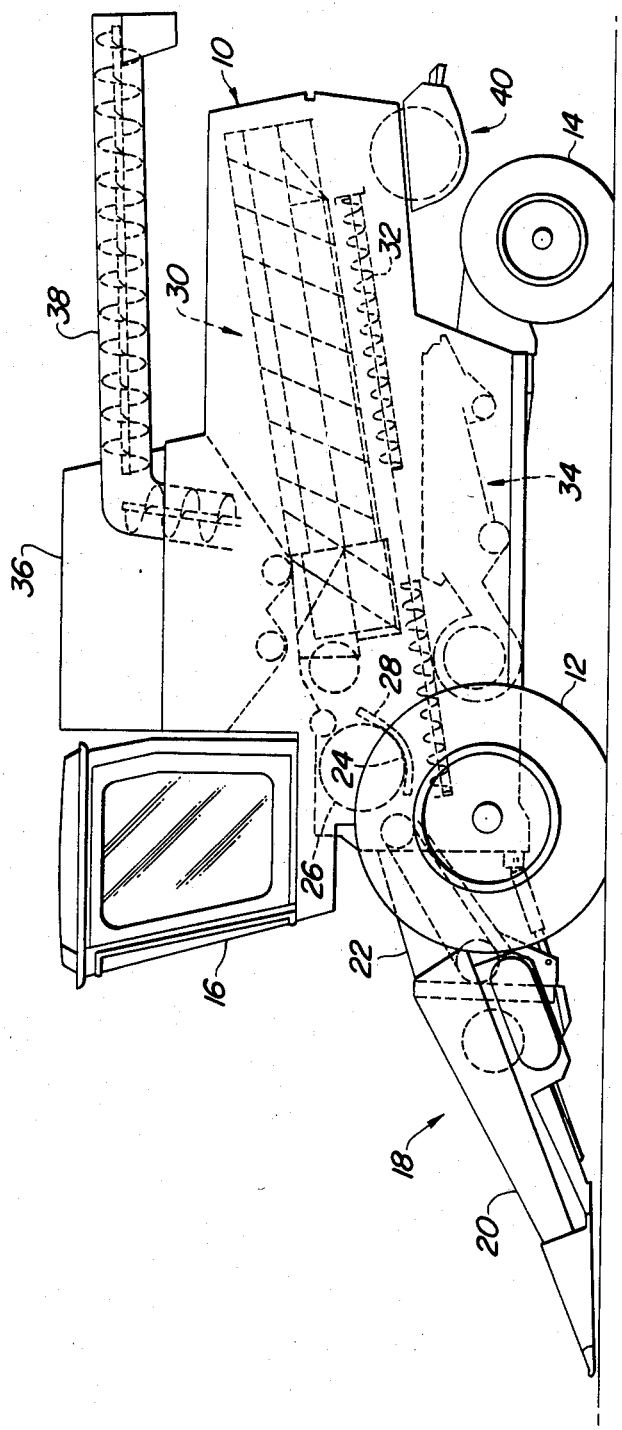
FIG. 1 is a left-hand side elevation of a self-propelled combine harvester embodying the invention.

The invention is embodied in a self-propelled combine harvester, shown somewhat schematically in FIG. 1, and particularly in the crop handling and processing means of such a harvester.

The harvester includes a body 10 supported above the ground on powered front wheels 12 and steerable rear wheels 14. Other portions of the harvester which are collectively generally conventional in nature and arrangement include the forward mounted operator station 16, a forward header 18 pivotably supported by the body 10 for adjustment of operating height and including a gatherer 20 (in this case a corn head) for removing crop material from a field, and a feeder house 22 for taking crop material from the gatherer 20 and delivering it to a transversely extending threshing zone 24. The latter is defined by conventional threshing cylinder and concave, 26 and 28, respectively.

In the threshing zone 24, material is divided into two main streams, one consisting principally of threshed grain passing radially outward through the bars of the concave 26, and the remaining material, largely straw, being discharged circumferentially rearwardly and upwardly to be received by what will be named here as the separator 30 and described in detail below.

Reverting to conventional aspects of the harvester, separated material passing downwards from the concave 28 and from the separator 30 is intercepted by a collecting conveyor 32 and delivered to a cleaning shoe 34. From the shoe, conventional conveying arrangements (not shown) take cleaned grain to a tank 36 to be held temporarily before unloading from the combine through an unloading auger assembly 38. Straw discharged from the rearward or dowwnstream end of the separtor 30 is received by a straw chopper 40.

Figure 4:
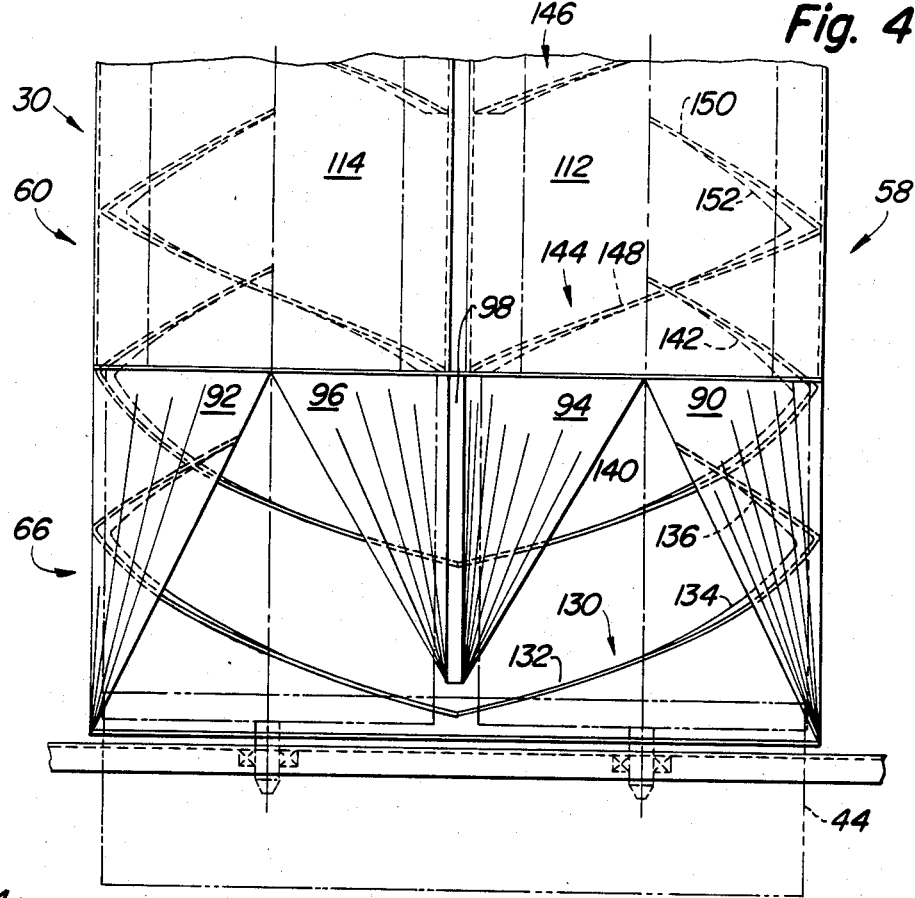
FIG. 4 is an overhead view of the forward separator portion taken approximately on line 4—4 of FIG. 3.
Figure 3:
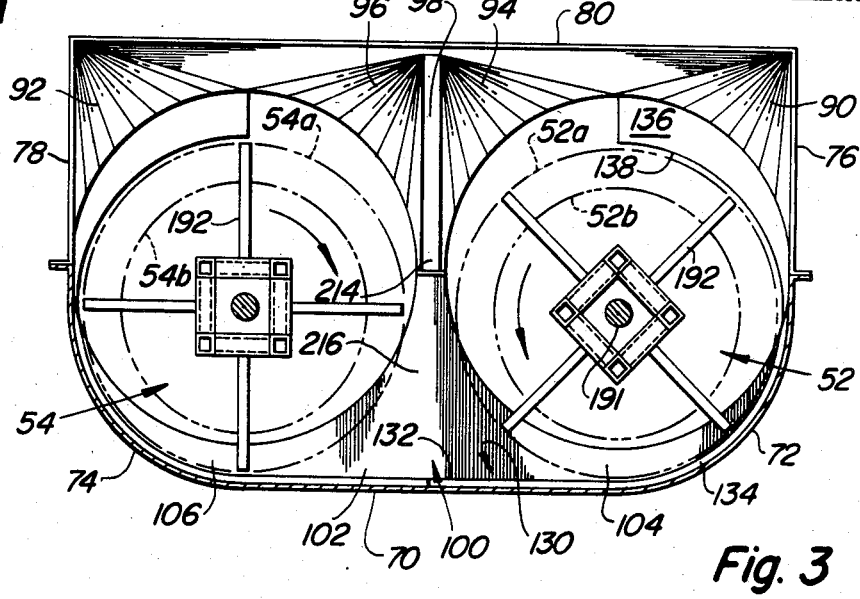
FIG. 3 is a front view of the separator portion of the crop processing means taken approximately on line 3—3 of FIG. 2.

Looking now at the separator 30, in more detail and referring particularly to FIGS. 2, 3 and 4, crop material carried circumferentially through the threshing zone 24 is received and propelled into the separator by a beater 44 cooperating with an overhead curved guide plate 46. A smooth tubular stripper 48 assists in material control.

Beater 44, guide plate 46 and stripper 48 all extend substantially the full width of the threshing cylinder 26. A generally conventional finger bar grate 50 extending rearwardly from the downstream end of the concave 28 prevents downward passage of straw and other large particles of the crop material mass while permitting a certain amount of additional separation and passage of threshed grain downwards to the collecting conveyor 32.

The principal components of the separator 30 are a pair of side-by-side parallel rotors, left- and right-hand, 52 and 54 respectively, enclosed in a housing or casing 56. Each rotor is a unitary structure but is differentiated over its length into rotor infeed, separating and discharge portions 52a, 52b, 52c and 54a, 54b, 54c, respectively. For the greater portion of their length, the rotors are housed separately, completely surrounded by their own cylindrical casings, left- and right-hand, 58 and 60, respectively, each having its own downstream discharge or outlet opening, left- and right-hand 62, 64 respectively. However, in the infeed portion of the separator (casing feed portion 66) there is essentially no internal division. An infeed chamber 68 of generally rectangular cross section with rounded bottom corners is defined by a flat generally horizontal floor portion 70 contiguous with generally cylindrical casing portions left- and right-hand 72 and 74, respectively, in turn contiguous with opposite upright, approximately triangular sidewalls, left- and right-hand, 76 and 78 respectively, and a rearwardly and downwardly sloping top wall 80. A front wall or bulkhead 82 covers the lower forward end of the infeed chamber 68 leaving a rectangular transversely extending inlet opening 84 occupied in large part by the beater 44.

The overall width and height dimensions of the feed casing 66 are somewhat greater than the combined overall dimensions of the two cylindrical separator casings 58, 60 (which are however, closely spaced). The junction between the feed and separator casing portions is made, in its upper half, by curved and sloping transition surfaces and in the lower half, by a "step". Upper, outer conically formed transitions, left-hand and right-hand, 90, 92 respectively, extend between the top wall 80 of the feed casing and the sidewalls 76, 78 and connect with the forward edges of the separator casings 58, 60. Preferably the arrangement also includes upper, inner, conically formed transition members left- and right-hand, 94, 96 respectively, also connecting with the cylindrical separator casings 58, 60 and extending downwards from the feed casing top wall 80 to meet each other at a central, rearwardly and downwardly sloping dividing edge 98.

The upright rear wall 100 of the lower portion of the feed casing 66 includes a central portion 102 between the two separators and outer tapering portions left- and right-hand 104, 106, serving as risers for the step from the floor of the infeed chamber 68 into the separator casings 58, 60.

The separator casings each include a foraminous separator grate left- and right-hand 108, 110, respectively, extending the full length of the separator portion and occupying its lower half while the upper halves of the casing left- and right-hand 112, 114, respectively, are "solid" sheet metal. In the casing discharge sections 62, 64, the casings open downwards constituting discharge outlets left- and right-hand 116, 118, respectively, but each opening includes an outer deflector member left- and right-hand 120, 122, respectively, wrapping the lower outer quadrant of the separator casing and tapering rearwardly and upwardly.

In that the separator 30 is symmetrical about a central longitudinal vertical plane, it is generally sufficient to describe only one side of the separator. Thus, in the following description where possible and convenient, only the left-hand components will be described, left- and right-hand being as seen by an observer standing behind the machine and facing in the direction of forward travel.

A series of generally helically extending internal guide surfaces span the length of the separator casing 56. The general form of these is a vane formed of a strip of steel with an outer edge fixed to the inside surface of the casing and with the faces of the strip approximately perpendicular to the surface. In the feed casing 66, as best seen in FIGS. 3 and 4, a front or first feed guide vane 130 comprises floor and lower quadrant portions 132, 134, of uniform height and, continuing in the upper outer quadrant, an upper portion 136, increasing in width or radial extent so that its inner edge 138 remains approximately concentric with the rotor 52. A second or rear feed vane 140 is similar to the first 130 except that its upper quadrant portion 142 extends almost wholly within the separator casing 58.

Within the separator casing 58, the guide vanes are all of similar form but a front or first separator guide vane 144 has a helix angle similar to that of the feed guide vanes 130, 140 and greater than that of each of the series of separator guide vanes 146 spaced through the separator casing portion and shorter vanes 147 in the discharge area 62. Taking the form of the first separator guide vane 144 as exemplary, it consists of a lower portion 148 of uniform height spanning approximately the lower 180 degrees of the casing (separator grate 108) and an upper quadrant 150 tapering to a maximum width at approximately top dead center of the casing so that its inner edge 152 remains approximately concentric with the rotor 52.

Figure 7:
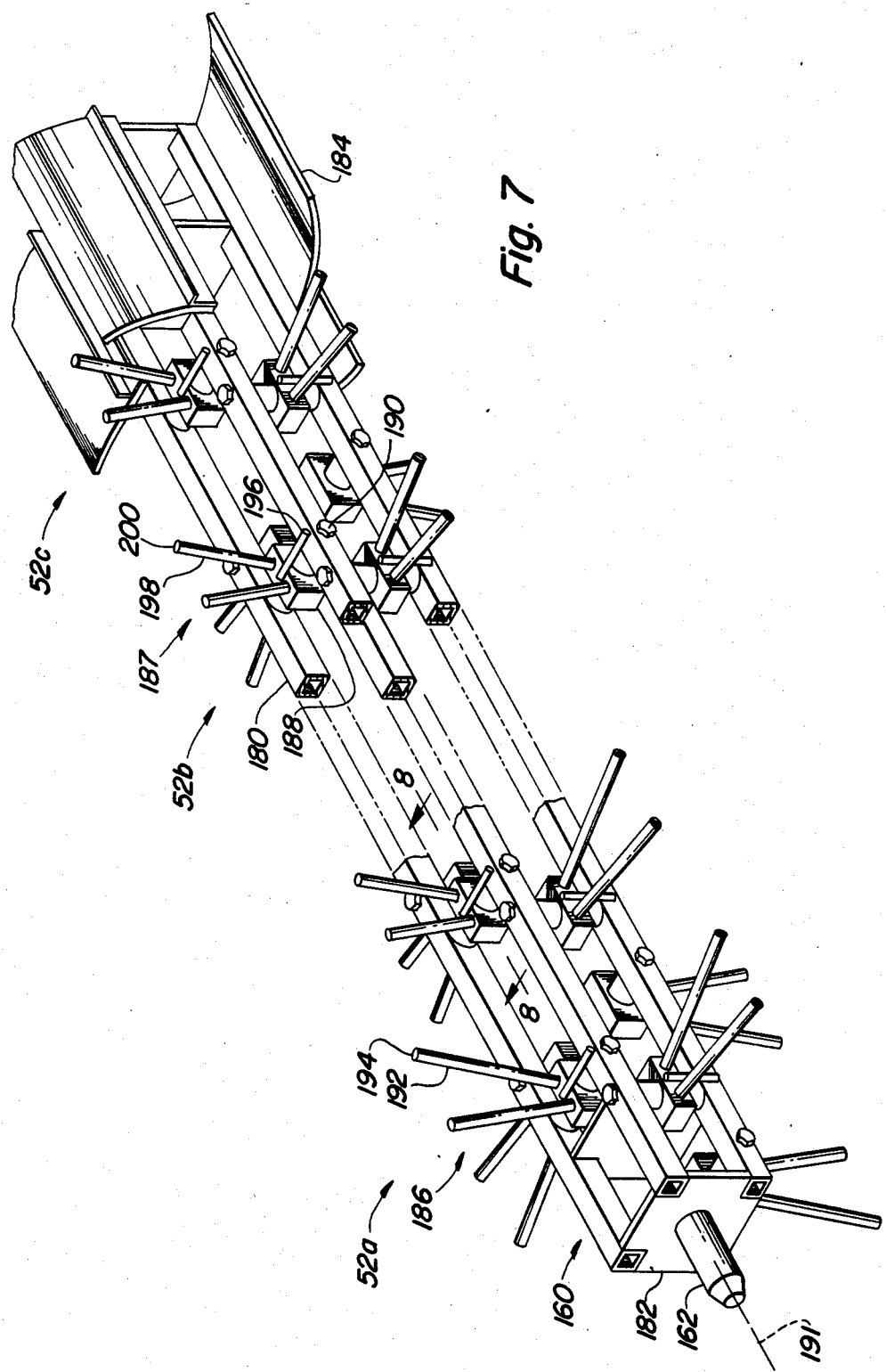
FIG. 7 is a left-hand front three-quarter perspective view of the left-hand rotor of the separator.

Turning now to the structure of the rotors 52, 54 and referring particularly to the left-hand rotor 52 as shown in FIG. 7, the rotor frame 160 extends the full length of the casing 56 and includes front and rear coaxial stub shafts 162, 164, respectively on which the rotor is supported, offset vertically downwards with respect to the casing. The front shaft 162 is journaled in a bearing 166 carried by a transverse frame member 168 forming part of a combine body 10. At the rear end of the rotors, a rotor drive system 170 supported on a rear transverse frame member 171 includes a pair of right angle gear boxes 172, 173, left- and right-hand respectively driven by a common input shaft 174 and having output shafts left- and right-hand 176, 178, respectively, connected to and supporting the rear ends of the rotors at their rear stub shafts 164. The drive ratios of the gear boxes 172 are equal so that the two rotors 52, 54 are driven at equal speeds and with constant timing.

The frame 160 of the rotor is square in cross section consisting of four elongated tubular frame members 180, one at each corner of the square, attached to and spaced by a series of spreader plates 182. Each tube carries at the downstream end of the rotor an approximately radially extending discharge paddle 184.

Figure 10:
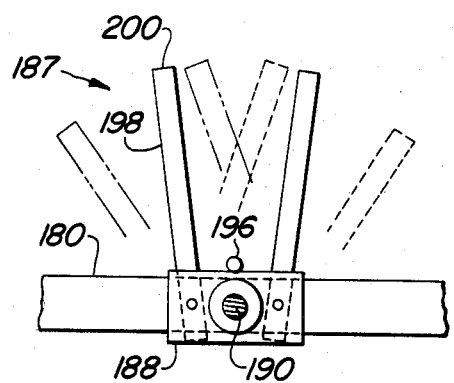
FIG. 10 is a partial view taken approximately on line 10—10 of FIG. 7 showing one of the finger assemblies of the rotor.

Pivotably supported between the tubes 180 of the rotor frame on all four sides of the rotor is a series of finger assemblies-infeed finger assemblies 186 in the rotor infeed portion 52a and separating finger assemblies 187 in the rotor separating portion 52b and extending into the discharge portion 52c. In each infeed finger assembly 186 a finger frame or base 188 is pivotably supported midway between a pair of adjacent frame tubes 180 by a pivot assembly 190 including a conventional low friction bearing bushing arrangement, for pivoting about an axis perpendicular to the rotor axis of rotation 191. From each finger frame or base 188, first and second crop engaging elements in the form of rods or fingers 192 extend generally radially but diverging somewhat. Each finger has an outer crop engaging portion or tip 194. Each finger assembly 186 may pivot freely within limits set by a stop pin 196 fixed to the finger frame 188 and engageable with an adjacent frame tube 180. The range of pivoting is indicated in FIG. 10.

In the separating and discharge portions of the rotor 52b and 52c respectively, the structure is the same as in the feed section 52a except that each finger 198 with its crop engaging outer portion 200 is somewhat shorter. As seen best in FIG. 7, the finger assemblies 186 and 187 are arranged in a continuous spiral with respect to the frame 160, the spiral preferably being opposite hand from that of a screw conveyor which would also convey rearwardly if rotated in the same direction as the rotor. The structure of the right-hand rotor 54 is identical but of opposite hand.

The operation of a conventional combine harvester is well understood and the conventional aspects of the present embodiment need not be discussed in any great detail. Emphasis will be on the feeding of the separator 30 and processing, handling and discharge of material from the separator.

As the combine advances over the field, crop material is gathered and delivered to the threshing zone 24 in the usual way. In the threshing zone, a significant amount of separation as well as threshing takes place with much of the threshed grain passing outwards and downwards through the bars of the concave 28. The bulk of material comprising mostly straw and chaff but including some, as yet, unseparated grain is discharged rearwardly and upwardly from the threshing zone 24 for feeding into the separator 30. The stripper roller 48, rotating as indicated by arrow 210 in FIG. 2, reduces any tendency for material to be carried around or recirculated by the threshing cylinder 26 and also provides a live surface to assist in conveying and guiding material into engagement by the beater 44, which, with the help of the guide plate 46 and rotating as indicated by arrow 212, propels material overshot fashion rearwardly and downwardly into the upper part of the feed chamber 68, towards the rotor feed portions 52a, 54a.

U.S. Pat. No. 4,611,606, also assigned to the assignee of the present invention, describes more fully a generic form of this feeding arrangement in which crop material is drawn between contra-rotating rotors. The present embodiment is characterized by a particular configuration of the feed casing 66 including the helical guide surfaces (guide vanes 130, 140) in combination with "passive" rotors 52, 54 and a particular delivery arrangement (stripper 48, beater 44 and guide plate 46).

The relative elevation of the beater 44 and the feed casing top wall 80 above the rotors and the extent of the opposite vertical sidewalls 76, 78 together provide an unconfined discharge zone for the beater 44 so that material leaves the beater cleanly. The downward slope of the feed casing top wall 80 and the conically shaped guide surfaces 90, 92, 94 and 96 immediately begin to guide or assist the crop material downwards into the bite 214 between the rotors as it moves rearwardly. The relatively longer fingers of the rotor feed portions, 52a, 54a improve the efficiency of the rotors in receiving the generally rearward and downward linear flow of material propelled from the beater 44 and dividing it and converting the flow into contra-rotating annular mats as the material enters the separator casings.

It is the nature of rotors according to the invention that as the rotor rotates at normal operating speeds and with the fingers not engaged by a crop material mat, the fingers assume their fully extended attitude. In the present embodiment this is essentially radial. In the bite 214 between the rotors and in the space above it, the initial engagement and propulsion of the crop material by the fingers is essentially circumferential as the material is carried down through the bite into a dividing zone 216 between the rotors and the feed casing floor 70. Now the guide vanes 130, 140 begin to influence the direction of the crop material deflecting it downstream towards the separator casings. The fingers 192 of the rotor being free to pivot offer little resistance to this axial propulsion and follow the downstream movement of the material as long as they remain in active engagement with it. As seen best in FIG. 2, the feed casing guide vanes 130, 140 extend respectively to the inlet of the separator casing and, in the case of the second guide vane 140, beyond, so that crop material is carried smoothly into the mouth or inlet of the separator casing 58 aided by the transitional inner surfaces of the conically shaped casing portions 90, 92, 94 and 96. The cooperative action of the passive rotor and active casing element with helical guide surfaces such as guide vanes is essentially similar whether in the transitional environments of the feed and discharge sections of the separator or within the axially extending or unchanging conditions of the separator portion itself. This cooperative function of the rotor and casing elements will be described in more detail below with reference to the separating portion of the separator.

The stepped form of separator casing, permitting the use of longer fingers in the rotor feed portion 52a results, of course, in a greater nominal diameter of the feed casing 66, at least in the lower portion, compared with the separator casing 58. Choosing a vertical or perpendicular relative axial step from the feed casing floor 70 up into the separator casing 58, as in the present embodiment, permits the greater diameter or longer fingers of the rotor feed portion 52a to be maintained throughout the length of the feed casing 66. Thus the rotor fingers at the downstream end of the rotor feed portion are available to sweep the full length of the feed casing floor, minimizing dead space at the critical point of entry into the separating casing 58. As can be seen in FIG. 3, the effective step 104 diminishes in height with respect to the direction of outward and upward movement of the material, so that any material engaged by the step is soon freed to continue its downstream movement under the influence of the guide vanes. As indicated in FIG. 2, the second feed portion guide vane 140 crosses into the separator casing 58 adjacent the end of the step 104 at about the level of the rotor axis 191 so that an uninterrupted guide surface is available for at least a portion of the crop material mat, to ease its entry into the separating casing 58.

Figure 8:
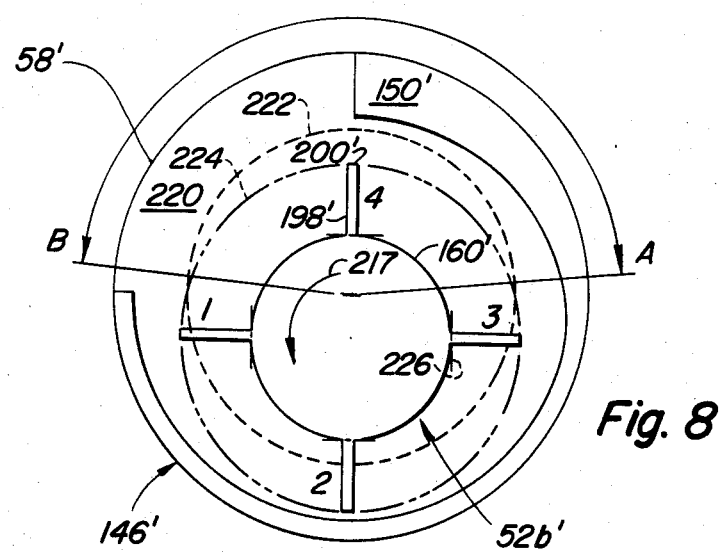
FIG. 8 is a partially schematic cross-sectional view of the left-hand separator portion taken approximately on line 8—8 of FIG. 2.
Figure 9:
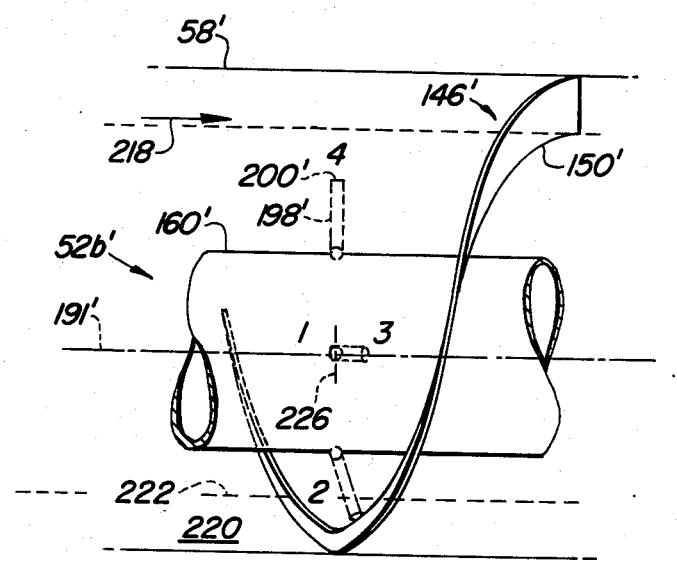
FIG. 9 is a partial and schematic side view of a portion of the left-hand separator illustrating, with reference to FIG. 8, the pivoting cycle of a rotor finger during the course of one revolution of the rotor when conveying and separating a mat of crop material.

FIGS. 8 and 9 offer a simplified representation of the cooperative function of a passive rotor 52b' and separator casing 58' with internal helical guide surfaces. The schematic drawings represent a "steady state" condition where the rotor is rotating at a constant speed in the direction indicated by arrow 217 and the material being processed and conveyed is in generally uniform motion, as for example, in an intermediate portion of the separator proper away from the end conditions of inlet and outlet or discharge. Arrow 218 indicates the downstream direction of material flow. The simplification includes representing crop material present in the separator as an annular mat 220 with a well-defined inner surface 222. Also, only the action of a single finger element 198' pivotably carried by a rotor frame 160' in relation to a single guide vane 146' will be considered. It is also assumed that the rate of feeding and flow of material through the separator, the diameter of the cylinders of revolution 224 swept by the rotor finger tips 200', the internal diameter (222) of the mat and the offset or eccentricity between the rotor and casing (and hence the mat) are such that there are zones of engagement and disengagement of the finger 198' with respect to the mat 220, defined by the intersections of the respective cylindrical surfaces 222, 224 of the mat and the finger tips 200'. In this example, the zone of disengagement of the finger is from A to B, somewhat less than 180 degrees.

Disengaged from the mat 220 and away from the influence of the guide vane 146', the finger 198', free to pivot only about an axis 226 perpendicular to and circumferentially extending with respect to the rotor axis 191', assumes a radially extending position under the influence of centrifugal force as the rotor rotates, (position 4 in FIGS. 8 and 9). The finger, by itself, provides only circumferential propulsion for the mat 220 but soon after its engagement with the mat (at B), the crop material portion propelled by the finger approaches and comes under the influence of the guide vane 146' (position 1 in FIG. 8). Due to the eccentricity, the penetration of the mat by the finger and the proximity of the finger to the guide vane increase as the finger moves between positions 1 and 2 and the axially deflecting influence of the guide vane increasingly dominates the centrifugally "righting" effect of the finger so that, carried by the crop material mat portion in which it is engaged, the finger is deflected axially downstream. (The external force provided by the material mat overcomes "righting" tendency of the finger.) This effect continues as the rotor carries the finger on from position 2 to 3 but eventually, somewhere between positions 3 and 4, the finger effectively becomes disengaged from the mat 220 and is free to resume its radially extending position ready, as it were, for the next bite or revolution.

The increased and increasing depth of the guide vane in its upper quadrant portion 150' helps to continue the spirally downstream motion of the crop material portion now travelling partly under inertia after release by the finger. The greater depth of the guide vane helps to continue guiding material downstream even though, say loss of speed, causes some falling away of the mat from the casing wall while in the zone of disengagement AB. This falling away and a certain amount of turbulence may of course contribute to efficiency of separation. Preferably, radial clearance between fingers and guide vanes, especially in the zone of engagement, should be the minimum that practical considerations permit.

Separators according to the invention, may of course be designed so that the respective axial spacings of fingers or finger assemblies in the rotor and of guide surfaces in the casing may result in specific axial disposition of fingers relative to guide vanes (as is suggested for example in FIG. 9). However, in the present embodiment as indicated in the drawings, the population of fingers is sufficiently dense or, the fingers are sufficiently closely spaced, that they function in aggregate to propel the crop material circumferentially, maintaining it in a mat generally in contact with the casing whenever rotational speed of the rotor exceeds a certain minimum so that the guide vanes are effective to displace the material axially regardless of any particular juxtaposition between finger and vane. The pivoting of individual fingers responsive to the guide vane effect will vary according, among other things, to their proximity or disposition relative to a guide vane when in their zone of engagement with the crop material mat. However, in normal operation, each finger, during a portion of each of its revolutions around the axis of the rotor, is free to pivot to follow the crop material mat downstream while maintaining its circumferential propulsion while in its principal zone of engagement and effectively retracting from the crop material mat outside of the zone of engagement, becoming free to regain its radially extending position.

The separator 30 is designed so that the crop material is long enough in contact with the separating grates 108 that separation of the remaining grain from the straw mass is virtually completed.

Figure 5:
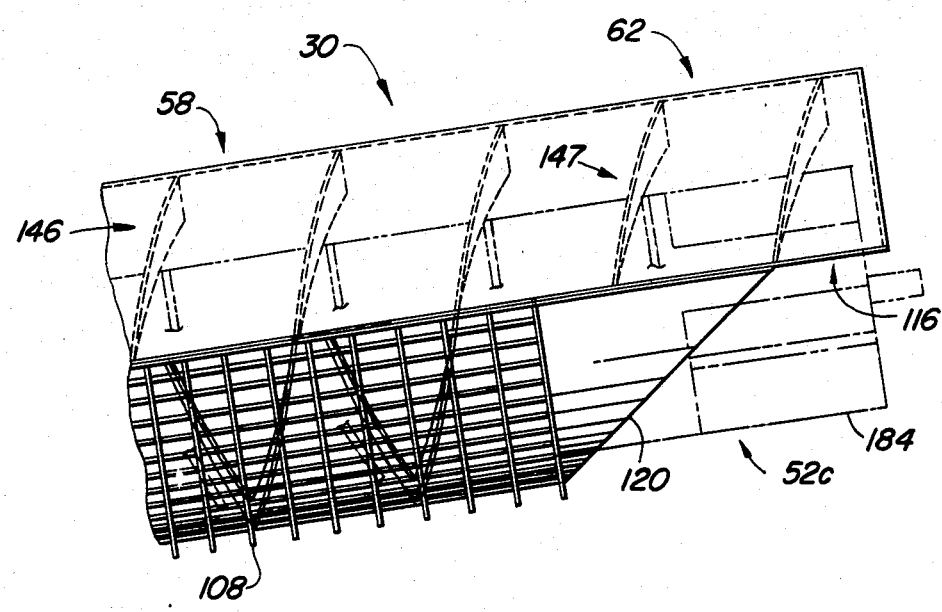
FIG. 5 is a left-hand side view of the rear section of the separator portion.

As seen best in FIG. 5, at least partial guide vanes 147 are continued into the discharge portion 62 of the separator. Rotor fingers also extend into the discharge portion so that positive axial propulsion extends somewhat beyond the separator portion proper to help ensure a smooth flow of material through the separator, for efficient separation and avoidance of blockages. The discharge casing guide member 120 helps to control the downward flow of material for efficient reception by the straw chopper 40.

The spiral arrangement of finger assemblies on the rotor described above makes for smoother operation of the rotor by reducing torque peaks compared with a rotor having, say, only two diametrically opposed rows of crop engaging elements. "Reversing" the spiral avoids the presentation of a "front" to the crop material being handled and reduces the tendency for roping by the material, as may occur, when rotor elements are arranged so as to create a positive screw conveyor effect.

As indicated in the drawings, especially FIG. 2, helix angle of the guide vanes may be chosen according to their function in the total separator system. Here, for example, the feed section guide vanes 130, 140 and the first guide vane 144 in the separator section all have a fairly sharp angle of about 30 degrees whereas the remainder of the guide vanes 146 in the separator section have an angle of about 14 degrees. The sharper angle in the feed section and initial portion of the separator section in part compensates for the inevitably somewhat less positive control of material in the feeding (transition) area when it is being received and divided and inserted in the separator casings, compared with the more predictable handling characteristics and rate of throughput in the more controlled conditions of the separator section where the surrounding casing more closely conforms to the rotor. Preferably, feed vane angle is also chosen so that material following the vanes will enter the separator within one revolution avoiding recirculation and redividing of crop material in the feed casing. Overall, the various helix angles chosen may be said to be matched to suit functional objectives which include avoidance of material buildup or backup in the feed area and, then, within the separator portions, to propel the material at an axial speed which suits the separation objectives.

Figure 6:
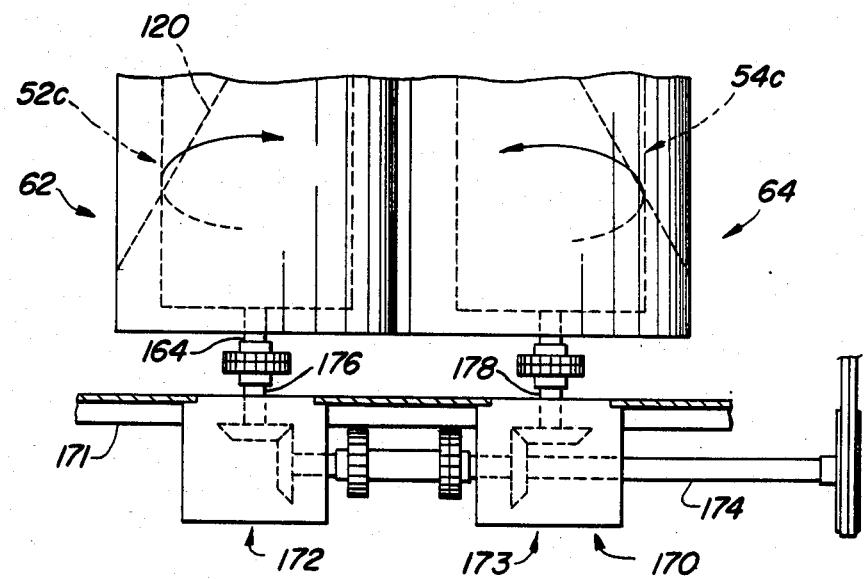
FIG. 6 is an overhead view of a rearward portion of the separator showing drive arrangements for the twin rotors.

The use of a coordinated positive drive to the two rotors, such as by drive system 170, (FIG. 6) makes it possible to time the rotors together to optimize or modify, as required, the aggressiveness of their combined engagement of incoming material at the bite 214 between the rotors in the feed chamber 68. In FIG. 3, the rotors 52, 54 are shown timed 45 degrees out of phase, producing a relatively aggressive bite.

Figure 11:
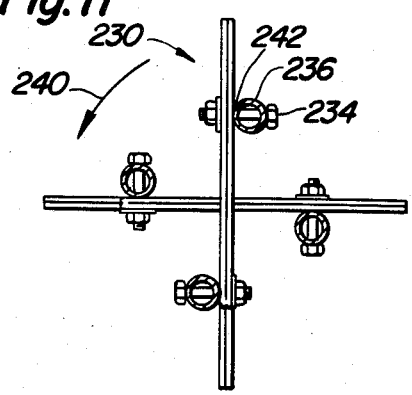
FIGS. 11 and 12 are respectively, cross-sectional and partial side views of an alternative embodiment of the rotor of the invention.
Figure 12:
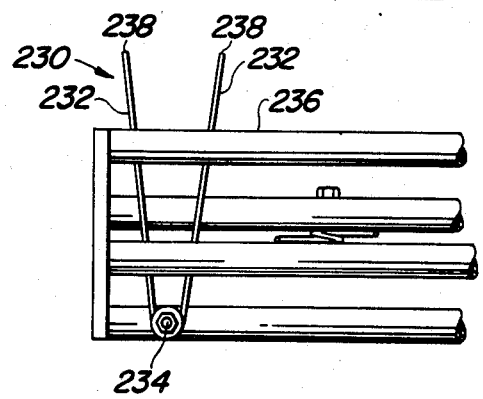

FIGS. 11-16 cover four alternative embodiments of rotors according to the invention. That of FIGS. 11 and 12 is similar to the first embodiment described above in that each finger element assembly 230 includes a pair of fingers 232 free to swing in unison about a common pivot 234. Axially extending tubular frame members 236 are held in fixed relationship by other frame members (not shown). The finger assemblies 230 are pivotally supported by the tubes 236 and each assembly extends through the frame of the rotor so that its crop engaging tip portions 238 extend radially outwards of the frame tubes 236. Pivots 234 are arranged so that in operation, with direction of rotation as shown by the arrow 240, circumferential deflection of each finger element assembly 230 is resisted by the fingers 232 bearing against the opposite frame tube 236, contacting it, as indicated, at 242 in FIG. 11. In this embodiment, the finger pivot axis is on the opposite side of the rotor axis from the finger crop engaging portion. Therefore, compared with the first embodiment, the swing radius for the finger is significantly greater so that its angular deflection is less for a given linear axially downstream movement. Using the rotor frame to help support or stabilize the fingers (contact 242) is a potentially cost reducing simplification.

Figure 13:
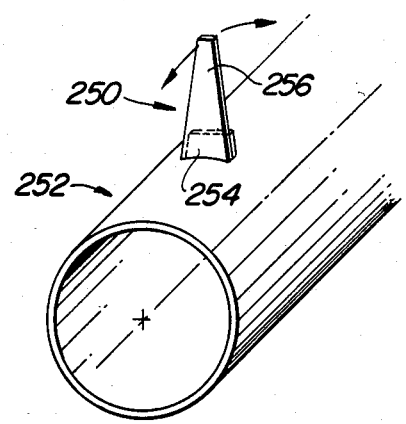
FIG. 13 is a perspective representation of a third alternative embodiment of a rotor according to the invention.

FIG. 13 represents another embodiment of the passive rotor, the displaceability of the finger 250 in this case resulting from flexibility in construction of the finger itself which is rigidly attached cantilever fashion to the rotor frame 252 rather than pivoted. Suitable finger characteristics may be achieved in a number of ways. For example, FIG. 13 shows a tapered finger 250 having a base or hinge portion 254 which is wider than its crop engaging or tip portion 256. Oriented as shown, this element will be relatively resistant to circumferential deflection at its tip while permitting necessary deflection in the axial direction when used in conjunction with helical guide surfaces. The material of such an element may be homogeneous or, as indicated in the drawing, maintaining the same "edge-on" orientation with regard to direction of rotation, the finger element may consist of a rigid outer portion, for example a steel strip of uniform width attached to the rotor frame 202 through or by an elastomeric insert providing the desired deflectability.

Figure 14:
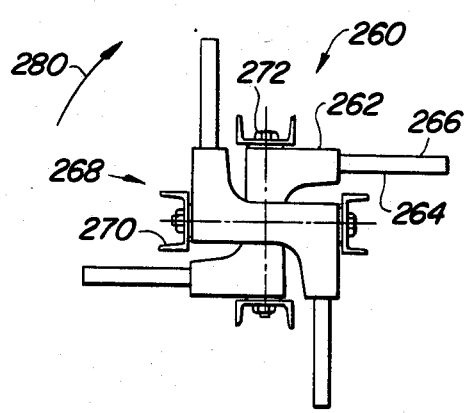
FIGS. 14 and 15 are respectively, cross-sectional and partial left-hand side views of a fourth alternative embodiment of a rotor according to the invention.
Figure 15:
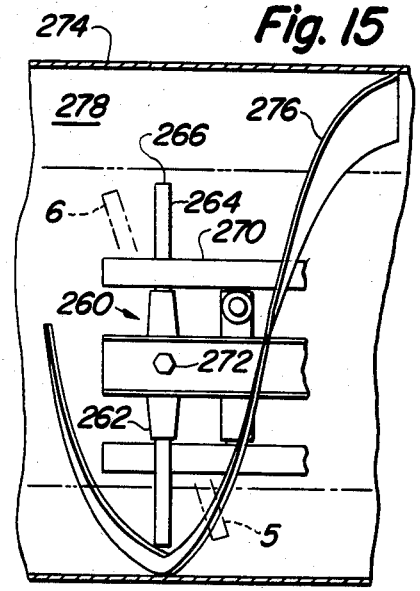

FIGS. 14 and 15 represent a fourth embodiment of rotor according to the invention in which the finger assembly 260 is double ended in that it consists of a pivot frame 262 carrying a pair of approximately diametrically opposed fingers 264 each with a crop engaging tip or outer portion 266. These assemblies 260 are pivotally carried in a rotor frame 268 consisting of longitudinal or axial channel members 270 held in fixed relationship to each other by other frame members (not shown). The finger assemblies 260 are pivotally supported between the channel members 270 by suitable pivot hardware 272. In FIG. 15, the disposition of an intermediate portion of such a rotor in a separator casing environment is indicated "in phantom outline" (casing 274 and guide vane 276). The operating or functional cycle for each finger crop engaging tip 266 is basically as described above with reference to FIGS. 8 and 9, for the "independent" fingers of the first embodiment. However, obviously in this embodiment, in each finger assembly 260, each opposite tip 266 is responsive to movement of the other tip. The result is that, as indicated in FIG. 15, when the first tip is in significant engagement with the crop material mat 278, (for example in position 5 in FIG. 15) and has been deflected downstream by the mat under the influence of the guide vane 276, the opposite tip will have been deflected upstream as indicated at position 6 while out of effective engagement with the crop material mat. Thus, compared with an independently pivoted "single" finger action, as described with reference to FIGS. 8 and 9, there is a preparatory "back-swing" and a relatively greater arc of swing is available for the engaged phase of finger action. Note, too, that with respect to a direction of rotation indicated by arrow 280, the fingers 264 are effectively inclined forward even though they are perpendicular to their own pivot axis. This finger attitude may be useful in some applications but in most the "pure" radial extension shown in FIG. 8 is preferred.

In the embodiment of FIG. 16, the rotor 282 takes the form of a cylindrical "brush" made up of a multiplicity of resilient fingers or bristles 284, closely spaced one from another. The separator configuration is again twin side-by-side rotor in a casing 286 including a feed portion 288 (only the lower portion is shown) and separator portions 290 and 292.

We claim:

1. A rotor arrangement for an axial flow rotary separator in which crop material is propelled as a mat in a generally spiral path in the annular space between a rotor and a casing surrounding the rotor and in which the rotor has an axis of rotation and a frame carrying crop engaging fingers for propelling crop material circumferentially, each finger being attached to the rotor frame at an attachment point and each attachment point, as the rotor rotates, moving only in a plane perpendicular to the rotor axis, and the casing has guide vanes for deflecting material downstrema characterized in that:
   the rotor axis is offset with respect to the casing so that as the rotor rotates, the finger may intermittently engage and effectively disengage the mat and the fingers are supported so as to be axially deflectable responsive to an external applied force and so that as the rotor rotates, the fingers, when disengaged, adopt a first or disengaged position; and
   so that in operation, as the rotor rotates, at least the outer portion of each finger may be deflected downstream by the mat when in engagement and when disengaged, the fingers may resume their first position.

2. An axial flow rotary separator having a rotor rotatably supported within a casing to define an annular space in which crop material is propelled circumferentially by the rotor and the casing has internal means for deflecting crop material downstream characterized in that:
   the rotor carries a plurality of crop material engaging elements normally extending outwards from the rotor in a first position and moving, as the rotor rotates, in a plane perpendicular to the rotor axis and being deflectable downstream from the first position responsive to an external force;
   the rotor speed and casing cross-sectional form and the relative juxtaposition of rotor and casing are such that, as the rotor rotates, the crop material engaging elements move from substantial engagement to substantial disengagement and so that while in engagement, the downstream deflection of a crop material portion in engagement with a crop material engaging element supplies an external force effective to deflect said element downstream so as to facilitate the movement of crop material in the separator; and
   the rotor includes means, effective upon disengagement of the crop material by a crop material engaging element, tending to restore said element to its first position.

3. An axial flow rotary separator for processing harvested crop material comprising:
   at least one elongated rotor including a plurality of crop engaging elements extending outwards with respect to the rotor axis of rotation, said elements, as the rotor rotates, each normally moving in a plane perpendicular to the rotor axis but, responsive to an externally applied force, displaceable in a plane approximately parallel to the axis of rotation and rotatable to generate a surface of revolution defined by the outer extremities of the crop engaging elements;
   an elongated tubular casing having a wall and an upstream inlet and a downstream outlet and surrounding a portion of the length of the at least one rotor and defining an annular space between the rotor and the wall, the form of the wall and its disposition relative to the at least one rotor being such that the radial thickness of the annular spacing between the rotor surface of revolution and the wall in non-uniform so that the annular space includes at least one each of circumferentially spaced zones of greater and lesser radial thickness respectively;
   a plurality of elongated guide surfaces extending internally of the casing within the annular space and disposed helically with respect to the axis of rotation;
   means for delivering crop material to the casing inlet for engagement by the at least one rotor;
   means for driving the at least one rotor at such a speed and in such a direction that crop material engaged by the crop engaging elements of the rotor is propelled circumferentially in the annular space and maintained generally as a mat following the casing wall, the guide surfaces being disposed to engage portions of the mat and deflect them downstream and so that, as the rotor rotates, the zones of greater and lesser radial thickness of the annular space permit the radial penetration of the crop engagine elements to vary between substantial engagement and substantial disengagement.

4. An axial flow rotary separator in which a rotor propels crop material in a generally spiral path through a casing surrounding the rotor, the casing having at least one foraminous portion and the rotor having a frame and including a plurality of generally radially extending fingers, the driven speed of the rotor being sufficient to maintain the crop material by centrifugal force in a mat generally in contact with the inside surface of the casing, the fingers fully engaging the mat only intermittently, in a zone of engagement in which the spacing between the fingers and the casing is diminished, characterized in that:

the fingers are supported so that in operation, when disengaged, each finger follows a circular path perpendicular to the rotor axis of rotation but is displaceable axially, responsive to an external force greater than a predetermined minimum, and the combination of rotor frame and fingers includes means tending to restore each finger to its circular path from a displaced position and the casing includes a plurality of helically disposed guide surfaces for deflecting mat portions downstream at least portions of some of which are circumferentially adjacent the zone of engagement, guide surfaces and crop material mat portions cooperating to generate external forces in downstream direction greater than the predetermined minimum so that the fingers may at least partially follow the downstream deflection of mat portions with which they are engaged and so that beyond the zone of engagement, the means for restoring the fingers to their circular paths becomes effective.

5. The separator of claim 4 wherein each finger is resilient and is attached rigidly and cantilever fashion to the rotor frame and wherein the means for restoring the element to its circular path resides in the resilience of the element itself.

6. The separator of claim 5 further characterized in that the rotor includes a multiplicity of fingers closely spaced one from another, so that the rotor comprises a generally cylindrical brush-like structure.

7. The separator of claim 5 wherein each finger is relatively more resilient in an axial direction than in a circumferential direction.

8. The separator of claim 4 wherein each finger is pivotably attached to the rotor frame for pivoting in a plane approximately parallel to the rotor axis of rotation.

9. The separator of claim 4 further characterized in that the rotor includes a plurality of stop elements, each one operative to limit the pivoting of at least one of the fingers so that the longitudinal axes of all fingers so limited, always diverges radially outwardly from the axis of rotation of the rotor.

10. The separator of claim 8 further characterized in that the finger pivot axis is disposed between the rotor axis and the crop engaging portion of the finger.

11. The separator of claim 8 further characterized in that the finger pivot axis is disposed on the opposite side of the rotor axis from the crop engaging portion of the finger.

12. The separator of claim 8 further characterized in that the fingers are carried by the rotor in groups sharing a common pivot axis with respect to the rotor and each group includes at least two axially spaced fingers.

13. The separator of claim 8 wherein the means for restoring the finger to its circular path includes disposing the center of mass of the finger with respect to its pivot axis so that when in operation and responsive to centrifugal force and the center of mass of the element is radially outward of its pivot, the crop engaging portion of the finger is disposed in a desired predetermined position.

14. The separator of claim 4 wherein the fingers are arranged in opposed pairs, each pair spanning the rotor axis of rotation and pivotably attached to the rotor frame so that displacement of one of the pair in one direction results in displacement of the other of the pair in the opposite direction.

15. The separator of claim 14 wherein each member of an opposed pair of fingers is in fixed relationship to the other member of the pair and the pair shares a common pivot axis.

16. The separator of claim 15 wherein the common pivot axis intersects and is perpendicular to the axis of rotation of the rotor.

17. The separator of claim 16 further characterized in that each finger of the pair extends approximately perpendicular to the common pivot axis and is disposed respectively on the opposite side of the rotor axis of rotation from the other of the pair.

18. The separator of claim 4 wherein with respect to the direction of rotation, at least the outer portion of each finger is forwardly inclined with respect to the direction of rotation of the rotor.

19. The separator of claim 4 wherein the casing is generally cylindrical and the rotor axis is disposed eccentrically with respect to the casing so that the radial clearance between rotor and casing varies from a minimum to a maximum and wherein the position of minimum radial clearance defines the center of the zone of engagement measured circumferentially.

20. The separator of claim 19 further characterized in that the at least one foraminous portion of the casing and the zone of engagement substantially circumferentially overlap.

21. The separator of claim 4 further characterized in that in any one axially extending portion of the separator, the fingers of the rotor and the guide surfaces of the casing are substantially uniformally distributed with respect to their axial spacing and wherein the axial spacing of the guide surfaces is substantially greater than that of the finger-like elements.

22. The separator of claim 4 further characterized in that each helically disposed guide surface substantially circumferentially spans the zone of engagement and extends for not less than approximately 180 degrees.

23. The separator of claim 4 further characterized in that each helically disposed guide surface is provided by a vane-like element extending radially from the inner surface of the casing and wherein the radial height of the vane increases in the direction of rotor rotation.

24. The separator of claim 4 further characterized in that the zone of engagement is disposed generally below the axis of rotation of the rotor and in that at least some of the helically disposed guide surfaces extend circumferentially from within the zone of engagement to approximately top dead center of the casing.

25. An axial flow rotary separator for a combine, the combine including threshing means having a transversely extending threshing cylinder and means for gathering crop material from a field and delivering it to the threshing means, the threshing means being operable to thresh the crop material and deliver threshed crop material generally rearwardly, comprising:

a pair of side-by-side fore-and-aft extending generally cylindrical elongated separator casings each including a foraminous area and an upstream inlet and a downstream outlet, the inlets being in approximately lateral alignment and each casing including a series of internal axially spaced guide surfaces disposed helically with respect to the casing longitudinal axis;

a separator infeed casing having walls defining a feed chamber and including angled guide surfaces spanning at least a portion of said walls, said feed chamber having a single downstream outlet spanning and communicating with both separator casing inlets, said walls including a generally upright, laterally extending wall spaced upstream from the separator casing inlets and having an upper edge, a floor extending between the bottom of the upright wall and the separator casing inlets adjacent their lower portions, a pair of opposite longitudinally extending sidewalls extending between the opposite lateral sides of the upright wall and the separator casing inlets adjacent their respective opposite outer portions, and a top wall having an upstream edge spaced above the upper edge of the upstream upright wall and a downstream edge spanning the separator casing inlets adjacent their upper portions, said upper wall generally converging on the direction of the axes of the separator casings in a downstream direction, said infeed casing upstream upright wall upper edge, top wall upstream edge, and said opposite sidewalls defining an infeed inlet opening disposed generally above the level of the axes of the separator casings and said inlet opening being in a receiving relationship with the discharge of threshed material from the threshing means;

a pair of separator rotors including first and second rotors extending from adjacent the infeed casing upstream wall to the downstream end of the separator casings, the first and second rotors respectively occupying one and the other of the separator casings and being supported for rotation about axes of rotation parallel to the longitudinal axes of the separator casings but offset below the casing axes, each rotor including a frame carrying a plurality of crop engaging fingers, each finger connected to the rotor frame and normally extending generally radially with respect to the rotor axis of rotation and including a radially outward crop engaging portion displaceable axially, responsive to an externally applied force greater than a predetermined minimum and including fingers disposed so as to engage crop material delivered to the infeed chamber; and means for rotating the rotors in mutually opposite directions and in directions such that, in the infeed chamber, material engaged by the rotors in the upper portion of the chamber is carried down between the rotors and at such speed of rotation that crop material is maintained in a somewhat annular mat generally in contact with the casings and the finger length, rotor axis offset, and crop material mat thickness is such that as the rotors rotate, each finger periodically engages and effectively disengages radially the crop material mat while each rotor overall maintains circumferential propulsion of the material and wherein the guide surfaces of the feed casing and of the separator casings on their respective sides are angled in the same direction and in such direction that engagement of the crop material mat with the guide surfaces deflects the mat axially downstream and each mat portion in engagement with a finger is effective to apply an external force to the respective finger crop engaging portion greater than the predetermined minimum so that said finger portion is displaced axially downstream.

26. The separator of claim 25 and further including conveyor means adjacent the infeed casing inlet opening for assisting the transfer of threshed crop material from the threshing means to the infeed chamber.

27. The separator of claim 26 wherein the conveying means includes a laterally extending beater substantially spanning the infeed inlet opening and having an axis of rotation approximately parallel to that of the threshing cylinder and a laterally extending guide plate disposed above and partially wrapping said beater and wherein the direction of rotation of the beater is such that threshed crop material discharged by the threshing means is received generally tangentially by the beater and conveyed between the beater and the guide plate, said guide plate having a downstream discharge edge adjacent the upstream edge of the infeed casing top wall.

28. The separator of claim 27 and further including a laterally extending stripper roller disposed between the threshing cylinder and the beater and rotatable in a direction opposite that of the beater for assisting crop material discharged by the threshing cylinder into engagement by the beater.

29. The separator of claim 25 wherein the floor of the feed casing at least partially wraps the lower outer quadrants of the rotors constituting a floor wrapping portion and further including in each side of the casing, at least one guide vane extending diagonally across the floor and generally helically in the floor curved portion and wherein said guide vane extends generally radially from the surfaces of the floor portions and wherein said guide vane constitutes at least one of said guide surfaces and wherein the feed casing top wall adjacent its upstream edge is substantially flat and adjacent its downstream edge conforms approximately to the form of the adjacent separator casing inlet portions and wherein the top wall is formed to make a smooth transition from its flat upstream portion to its shaped downstream portion.

30. The separator of claim 25 wherein each rotor includes a feed portion substantially axially spanning the feed casing and a separating portion substantially axially spanning the separator casing and wherein in the respective rotor portions, the maximum radial extent of the crop engaging portions of the fingers is uniform and the maximum radial extent is greater in the feed portion than in the separating portion.

31. The separator of claim 30 wherein the rotor feed and separating portions are coaxial.

32. The separator of claim 25 wherein the helical guide surfaces in the feed casing and separator casings are disposed at a helix angle with respect to the axis of rotation of the respective rotors and wherein the helix angle of the guide surfaces in the feed casing is greater than the helix angle of at least some of the guide surfaces in the separator casings.

33. The separator of claim 25 wherein on each opposite side of the feed casing, a helical guide surface extends without interruption from the floor of the feed casing outwards and upwards into the respective separator casing.

34. The separator of claim 25 wherein the fingers are arranged on the rotor frame in a spiral with respect to the axis of rotation of the rotor and wherein the direction of the spiral is such that were it to define a conveying surface, the direction of conveying upon rotation of the rotor would be in an upstream direction.

35. The separator of claim 25 wherein the outlet end portions of each separator casing include at least one helical guide surface and wherein each rotor includes crop material engaging fingers aligned with an upstream portion of the outlet.

36. The separator of claim 25 wherein the means for driving the rotors includes timing means so that the relative rotational timing of the respective rotors may be predetermined and maintained so as to optimize material handling by the cooperating rotors in the feed chamber.

37. A separator feeding arrangement for transferring threshed crop material from the threshing section to the separating section of a combine, the threshing section including a transverse threshing cylinder cooperating with a concave partially wrapping the cylinder and operable to discharge a stream of threshed crop material generally rearwardly and the separating section including a pair of side-by-side generally cylindrical separator casings and associated separator rotors and each separator casing having an inlet, said inlets being approximately in lateral alignment, the separating section being rearward of and in substantial longitudinal alignment with the threshing section, comprising:
- a feed casing extending between adjacent the threshing section discharge and the separator casing inlets, said casing having a floor, a pair of opposite sidewalls, and a top wall coverging rearwardly towards the axes of the separator casings, said walls defining an infeed chamber having a downstream outlet end defined by the downstream portions of the top wall, opposite sidewalls and floor and substantially encompassing the side-by-side inlets of the separator casings and an elevated upstream inlet having an upper limit defined substantially by the upstream portion of the top wall of the casing and substantially spanning the threshing section discharge, said inlet being in a receiving relationship with the stream of threshed crop material;
- a feeder beater rotatable about an axis parallel to the axis of rotation of the threshing cylinder and in a direction opposite to that of the threshing cylinder disposed adjacent the casing inlet opening so as to intercept at least some of the stream of threshed crop material and convey it into the feed chamber;
- a pair of feed rotors having a plurality of crop material engaging elements, disposed side-by-side in the infeed chamber for rotation about axes approximately parallel to the axes of the separator casing, and axially deflecting means within the feed chamber for cooperating with the crop material engaging elements of the rotors;
- means for driving the rotors; and
- a guide plate portion included in the feed casing top wall upstream portion extending over and partially wrapping the feeder beater so that as the rotors rotate, threshed crop material delivered to the feed chamber in the space above the rotors is urged downwards into engagement by the rotor elements and propelled in a generally spiral path downstream into the inlet of the separator casings.

38. The separator feeding arrangement of claim 37 and further including a transversely extending stripper roller mounted for rotation about an axis parallel to the threshing cylinder axis and in the same direction of rotation as the threshing cylinder and disposed between the threshing cylinder and the feeder beater, with the stripper roller being elevated somewhat above the plane containing the respective axes of rotation of the threshing cylinder and the feeder beater so that at least some of the stream of threshed material from the threshing section is engaged by the stripper roller and deflected towards the feeder beater.

39. The separator feeding arrangement of claim 37 wherein the means for driving the rotors includes means for driving the rotors contrarotatably and in directions such that crop material delivered to the feed chamber above the rotors and engaged by the rotors is conveyed downwards between the rotors.

40. The separator feeding arrangement of claim 39 wherein the means for deflecting downstream crop material in the infeed chamber includes at least one pair of angled guide vanes carried on the infeed casing walls and means for mounting the crop engaging elements on the rotor so that at least the crop engaging portions of the elements are axially deflectable, one each of the pair of guide vanes being associated with one each of the separator casing inlets so that crop material engaged by the elements is propelled circumferentially by said elements and deflected axially downstream by the guide vanes, the crop engaging elements yielding axially downstream responsive to the direction of material flow under the influence of the guide vane and wherein the guide vane only partially circumferentially spans the rotational path of the rotor elements.

41. The separator feeding arrangement of claim 37 wherein the lateral extent of the threshing cylinder, the feeder beater and the infeed casing inlet opening are all approximately equal.

* * * * *